(12) United States Patent
Miyasaka

(10) Patent No.: US 10,544,290 B2
(45) Date of Patent: Jan. 28, 2020

(54) TIRE MEMBER MANUFACTURING METHOD AND TIRE MANUFACTURING METHOD

(71) Applicant: TOYO TIRE & RUBBER CO., LTD., Itami-shi, Hyogo (JP)

(72) Inventor: Takashi Miyasaka, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 142 days.

(21) Appl. No.: 15/674,699

(22) Filed: Aug. 11, 2017

(65) Prior Publication Data

US 2018/0105680 A1 Apr. 19, 2018

(30) Foreign Application Priority Data

Oct. 14, 2016 (JP) ................................. 2016-202797

(51) Int. Cl.
| | |
|---|---|
| *C08L 7/02* | (2006.01) |
| *C08J 3/215* | (2006.01) |
| *C08L 9/00* | (2006.01) |
| *C08K 3/04* | (2006.01) |
| *C08C 1/14* | (2006.01) |

(52) U.S. Cl.
CPC ..................... *C08L 7/02* (2013.01); *C08C 1/14* (2013.01); *C08J 3/215* (2013.01); *C08K 3/04* (2013.01); *C08L 9/00* (2013.01); *C08L 2310/00* (2013.01)

(58) Field of Classification Search
CPC .... C08J 3/215; C08C 1/14; C08L 7/02; C08L 9/00; C08L 2310/00; C08K 3/04
USPC ....................................................... 523/156
See application file for complete search history.

(56) References Cited

U.S. PATENT DOCUMENTS

| | | | | |
|---|---|---|---|---|
| 2014/0128531 A1* | 5/2014 | Miyazaki | ................. | C08K 3/04 524/496 |
| 2017/0137582 A1* | 5/2017 | Nomura | .................... | B60C 1/00 |

FOREIGN PATENT DOCUMENTS

| | | | |
|---|---|---|---|
| JP | 2014-95014 A | 5/2014 | |
| WO | WO-2016021089 A1 * | 2/2016 | ............... B60C 1/00 |

OTHER PUBLICATIONS

Office Action dated Jul. 12, 2019, issued in Chinese Patent Application No. 201710610127.9 with English translation.

* cited by examiner

*Primary Examiner* — Angela C Scott
(74) *Attorney, Agent, or Firm* — Westerman, Hattori, Daniels & Adrian, LLP

(57) ABSTRACT

A first tire member manufacturing method includes an operation in which master batch is made, and an operation in which the master batch and high-cis polybutadiene rubber are mixed. The operation in which the master batch is made includes an operation in which carbon-black-containing pre-coagulation rubber latex is coagulated to obtain a coagulum, an operation in which a compound according to Formula (I) is added to the water-containing coagulum, and an operation in which the compound according to Formula (I) is dispersed within the coagulum.

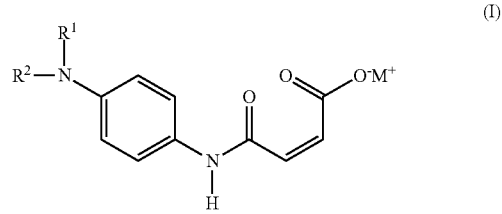

(I)

In Formula (I), $R^1$ and $R^2$ each indicates a hydrogen atom, an alkyl group having 1 to 20 carbons, an alkenyl group having 1 to 20 carbons, or an alkynyl group having 1 to 20 carbons. $R^1$ and $R^2$ may be the same or different, $M^+$ indicates sodium ion, potassium ion, or lithium ion.

18 Claims, No Drawings

TIRE MEMBER MANUFACTURING METHOD AND TIRE MANUFACTURING METHOD

TECHNICAL FIELD

The present invention relates to a tire member manufacturing method and a tire manufacturing method.

BACKGROUND ART

Patent Reference No. 1 discloses a method in which (2Z)-4-[(4-aminophenyl)amino]-4-oxo-2-butene acid sodium and carbon black are placed in a Banbury mixer and kneaded with rubber (hereinafter "prior manufacturing method"). Regarding (2Z)-4-[(4-aminophenyl)amino]-4-oxo-2-butene acid sodium, Patent Reference No. 1 further discloses that the terminal nitrogen functional group bonds to carbon black and that the carbon-carbon double-bond portion bonds to polymer.

PRIOR ART REFERENCES

Patent References

PATENT REFERENCE NO. 1: Japanese Patent Application Publication Kokai No. 2014-95014

SUMMARY OF INVENTION

Means for Solving Problem

A first tire member manufacturing method in accordance with the present disclosure comprises an operation in which master batch is made, and an operation in which the master batch and high-cis polybutadiene rubber are mixed. The operation in which the master batch is made comprises an operation in which carbon-black-containing pre-coagulation rubber latex is coagulated to obtain a coagulum. The operation in which the master batch is made further comprises an operation in which a compound according to Formula (I) (hereinafter "the compound according to Formula (I)"), below, is added to the water-containing coagulum. The operation in which the master batch is made further comprises an operation in which the compound according to Formula (I) is dispersed within the coagulum.

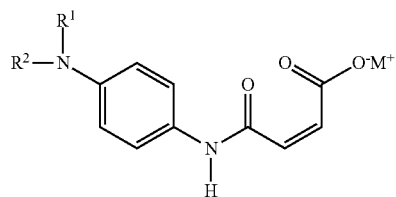

(I)

(At Formula (I), $R^1$ and $R^2$ each indicates a hydrogen atom, an alkyl group having 1 to 20 carbons, an alkenyl group having 1 to 20 carbons, or an alkynyl group having 1 to 20 carbons. $R^1$ and $R^2$ may be the same or different. $M^+$ indicates sodium ion, potassium ion, or lithium ion.)

A second tire member manufacturing method in accordance with the present disclosure comprises an operation in which master batch is made, and an operation in which the master batch and high-cis polybutadiene rubber are mixed. The operation in which the master batch is made comprises an operation in which a compound according to Formula (I) is added to a mixture comprising carbon black and rubber, and an operation in which the compound according to Formula (I) is dispersed within the mixture in the presence of water.

EMBODIMENTS FOR CARRYING OUT INVENTION

At tire sidewalls and the like, there has been occurrence of breakage due to flexural fatigue.

The present disclosure provides a method capable of improving fatigue resistance of tire members.

A first tire member manufacturing method comprises an operation in which master batch is made, and an operation in which the master batch and high-cis polybutadiene rubber are mixed. The operation in which the master batch is made comprises an operation in which carbon-black-containing pre-coagulation rubber latex is coagulated to obtain a coagulum. The operation in which the master batch is made further comprises an operation in which a compound according to Formula (I) is added to the water-containing coagulum. The operation in which the master batch is made further comprises an operation in which the compound according to Formula (I) is dispersed within the coagulum.

The first tire member manufacturing method permits more improvement of fatigue resistance than the prior manufacturing method. This is so firstly because the first tire member manufacturing method permits a high degree of dispersal of the compound according to Formula (I). This is so secondly because the first tire member manufacturing method permits a high degree of dispersal of carbon black. This is so thirdly because the first tire member manufacturing method permits effective manifestation of the flexibility of high-cis polybutadiene rubber.

The first tire member manufacturing method makes it possible for the compound according to Formula (I) to be dispersed to a high degree within rubber originating from the master batch. Because the compound according to Formula (I) is hydrophilic and because rubber in its dried state is hydrophobic, the compound according to Formula (I) tends not to be easily dispersed by the prior manufacturing method. In contrast, with the first tire member manufacturing method, the water content of the coagulum may facilitate dispersal of the compound according to Formula (I). The first tire member manufacturing method therefore permits more improvement in the dispersion characteristics of the compound according to Formula (I) than the prior manufacturing method.

The first tire member manufacturing method makes it possible for carbon black to be dispersed to a high degree within rubber originating from the master batch. This is because the first tire member manufacturing method employs a procedure in which carbon-black-containing pre-coagulation rubber latex is coagulated to obtain a coagulum.

The first tire member manufacturing method permits effective manifestation of the flexibility of high-cis polybutadiene rubber. Because the first tire member manufacturing method employs a procedure in which master batch comprising the compound according to Formula (I) is made and in which the master batch and high-cis polybutadiene rubber are mixed, it is possible to achieve a bias toward presence of the compound according to Formula (I) in rubber originating from the master batch. Moreover, the first tire member manufacturing method makes it possible for the compound according to Formula (I) to act as binder with respect to the carbon black and the rubber of the master batch during the stage at which the master batch is prepared. The first tire member manufacturing method therefore permits more reduction in bonding between the high-cis polybutadiene rubber and the compound according to Formula (I) than the prior manufacturing method, and permits manifestation of the flexibility of the high-cis polybutadiene rubber.

At the first tire member manufacturing method, the operation in which the master batch is made may further comprise, prior to the operation in which carbon-black-containing pre-coagulation rubber latex is coagulated to obtain a coagulum, an operation in which carbon black and a first rubber latex are mixed to obtain a carbon black slurry, and an operation in which the carbon black slurry and a second rubber latex are mixed to obtain the pre-coagulation rubber latex.

At the first tire member manufacturing method, it is preferred that the operation in which the compound according to Formula (I) is dispersed within the coagulum be an operation in which the compound according to Formula (I) is dispersed within the coagulum as the coagulum is being dewatered.

At the first tire member manufacturing method, at the operation in which the compound according to Formula (I) is added to the coagulum, taking the amount of water in the coagulum for every 100 parts by mass of rubber within the coagulum to be Wa, and taking the amount of compound according to Formula (I) that is added for every 100 parts by mass of rubber within the coagulum to be Wb, it is preferred that the ratio of Wa to Wb (i.e., Wa/Wb) be in the range 1 to 8100.

At the first tire member manufacturing method, it is preferred that the tire member be made up of a rubber composition that comprises a rubber component, and that the amount of high-cis polybutadiene rubber in the rubber composition be in the range 20 mass % to 60 mass % per 100 mass % of the rubber component.

A first tire manufacturing method may comprise the first tire member manufacturing method.

A second tire member manufacturing method comprises an operation in which master batch is made, and an operation in which the master batch and high-cis polybutadiene rubber are mixed. The operation in which the master batch is made comprises an operation in which a compound according to Formula (I) is added to a mixture comprising carbon black and rubber, and an operation in which the compound according to Formula (I) is dispersed within the mixture in the presence of water.

The second tire member manufacturing method permits more improvement of fatigue resistance than the prior manufacturing method. This is because, at the second tire member manufacturing method, the water may facilitate dispersal of the compound according to Formula (I).

The second tire member manufacturing method permits effective manifestation of the flexibility of high-cis polybutadiene rubber. Because the second tire member manufacturing method employs a procedure in which master batch comprising the compound according to Formula (I) is made and in which the master batch and high-cis polybutadiene rubber are mixed, it is possible to achieve a bias toward presence of the compound according to Formula (I) in rubber originating from the master batch. The second tire member manufacturing method may also make it possible for the compound according to Formula (I) to act as binder in advance with respect to the carbon black and the rubber originating from the master batch. The second tire member manufacturing method therefore permits more reduction in bonding between the high-cis polybutadiene rubber and the compound according to Formula (I) than the prior manufacturing method, and permits effective manifestation of the flexibility of the high-cis polybutadiene rubber.

A second tire manufacturing method may comprise the second tire member manufacturing method.

A tire member manufacturing method in accordance with a first embodiment comprises an operation in which carbon black and rubber latex are mixed to obtain a carbon black slurry. Mixing the carbon black and the rubber latex makes it is possible to prevent reflocculation of carbon black. This is thought to be due to formation of an extremely thin latex phase on all or part of the surface of the carbon black, the latex phase inhibiting reflocculation of carbon black. As examples of the carbon black, besides SAF, ISAF, HAF, FEF, GPF, and other such carbon blacks ordinarily used in the rubber industry, acetylene black, Ketchen black, and/or other such electrically conductive carbon blacks may be used. The carbon black may be nongranulated carbon black or may be granulated carbon black that has been granulated based upon considerations related to the handling characteristics thereof as is ordinary practice in the rubber industry. The rubber latex at the operation in which the carbon black slurry is made may for example be natural rubber latex, synthetic rubber latex, and/or the like. The number average molecular weight of natural rubber within the natural rubber latex might, for example, be not less than 2,000,000. The synthetic rubber latex might, for example, be styrene-butadiene rubber latex, butadiene rubber latex, nitrite rubber latex, and/or chloroprene rubber latex. It is preferred that solids (rubber) concentration in the rubber latex be not less than 0.1 mass %, more preferred that this be not less than 0.2 mass %, and still more preferred that this be not less than 0.3 mass %. The upper limit of the range in values for the solids concentration might, for example, be 5 mass %, it being preferred that this be 2 mass %, and it being more preferred that this be 1 mass %. The carbon black and the rubber latex may be mixed using a high-shear mixer, high shear mixer, homomixer, ball mill, bead mill, high-pressure homogenizer, ultrasonic homogenizer, colloid mill, and/or other such ordinary disperser.

In the carbon black slurry, carbon black is dispersed in water. It is preferred that the amount of carbon black in the carbon black slurry be not less than 1 mass %, and more preferred that this be not less than 3 mass %, per 100 mass % of the carbon black slurry. It is preferred that the upper limit of the range in values for the amount of carbon black in the carbon black slurry be 15 mass %, and more preferred that this be 10 mass %.

The tire member manufacturing method in accordance with the first embodiment further comprises an operation in which the carbon black slurry and rubber latex are mixed to obtain pre-coagulation rubber latex. The rubber latex for mixture with the carbon black slurry may for example be natural rubber latex, synthetic rubber latex, and/or the like. It is preferred that the solids concentration of the rubber latex for mixture with the carbon black slurry be greater than the solids concentration of the rubber latex at the operation in which the carbon black slurry is made. It is preferred that the solids concentration of the rubber latex for mixture with the carbon black slurry be not less than 10 mass %, and more preferred that this be not less than 20 mass %. The upper limit of the range in values for the solids concentration at the rubber latex might, for example, be 60 mass %, it being preferred that this be 40 mass %, and it being more preferred that this be 30 mass %. The carbon black slurry and the rubber latex may be mixed using a high-shear mixer, high shear mixer, homomixer, ball mill, bead mill, high-pressure homogenizer, ultrasonic homogenizer, colloid mill, and/or other such ordinary disperser.

In the pre-coagulation rubber latex, rubber particles, carbon black, and so forth are dispersed in water.

The tire member manufacturing method in accordance with the first embodiment further comprises an operation in which the pre-coagulation rubber latex is coagulated to obtain a coagulum. Coagulant may be added to the pre-coagulation rubber latex to cause it to coagulate. The coagulant might, for example, be an acid. As the acid, formic acid, sulfuric acid, and the like may be cited as examples. The coagulum obtained by coagulation of the pre-coagulation rubber latex contains water.

The tire member manufacturing method in accordance with the first embodiment further comprises an operation in which a compound according to Formula (I) is added to the coagulum. At the operation in which the compound according to Formula (I) is added, the amount Wa of water in the coagulum might, for example, be not less than 1 part by mass, it being preferred that this be not less than 10 parts by mass, for every 100 parts by mass of rubber within the coagulum. The upper limit of the range in values for Wa might, for example, be 800 parts by mass, it being preferred that this be 600 parts by mass. The amount Wb of compound according to Formula (I) that is added might, for example, be not less than 0.1 part by mass, it being preferred that this be not less than 0.5 part by mass, for every 100 parts by mass of rubber within the coagulum. The upper limit of the range in values for Wb might, for example, be 10 parts by mass, it being preferred that this be 5 parts by mass. It is preferred that the ratio of Wa to Wb (i.e., Wa/Wb) be in the range 1 to 8100. Causing Wa/Wb to be less than 1 would be unlikely to produce much benefit in terms of improvement of fatigue resistance. Above 8100, it might be the case that the water content of the coagulum will remain in the master batch.

Formula (I) is indicated below.

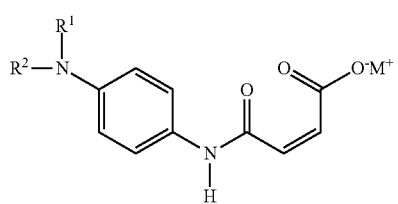

(I)

(At Formula (I), $R^1$ and $R^2$ each indicates a hydrogen atom, an alkyl group having 1 to 20 carbons, an alkenyl group having 1 to 20 carbons, or an alkynyl group having 1 to 20 carbons. $R^1$ and $R^2$ may be the same or different. $M^+$ indicates sodium ion, potassium ion, or lithium ion.)

At Formula (I), it is preferred that $R^1$ and $R^2$ each be a hydrogen atom. It is preferred that $M^+$ be a sodium ion. It is preferred that the compound according to Formula (I) be a compound according to Formula (I'), below.

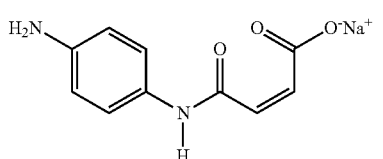

(I')

The tire member manufacturing method in accordance with the first embodiment further comprises an operation in which the compound according to Formula (I) is dispersed within the coagulum. The operation in which the compound according to Formula (I) is dispersed within the coagulum might, for example, be an operation in which the compound according to Formula (I) is dispersed within the coagulum as the post-addition-of-compound-according-to-Formula-(I) coagulum is being dewatered; more specifically, this might be an operation in which the compound according to Formula (I) is dispersed within the coagulum as a shear force is imparted at 100° C. to 250° C. to the post-addition-of-compound-according-to-Formula-(I) coagulum. It is preferred that the lower limit of the range in values for temperature be 120° C. It is preferred that the upper limit of the range in values for temperature be 230° C. A single screw extruder or other such extruder may be used for dispersing the compound according to Formula (I) within the coagulum.

The tire member manufacturing method in accordance with the first embodiment further comprises an operation in which, following dispersal of the compound according to Formula (I), drying and plasticization of the coagulum are carried out to obtain a master batch.

The master batch comprises rubber. The rubber might, for example, be natural rubber, polyisoprene rubber, styrene-butadiene rubber, nitrite rubber, chloroprene rubber, and/or the like. For every 100 mass % of the rubber, it is preferred that the amount of natural rubber in the master batch be not less than 70 mass %, more preferred that this be not less than 80 mass %, still more preferred that this be not less than 90 mass %, and still more preferred that this be 100 mass %. For every 100 mass % of the rubber, it is preferred that the amount of high-cis polybutadiene rubber in the master batch be not greater than 10 mass %, more preferred that this be not greater than 5 mass %, still more preferred that this be not greater than mass %, and still more preferred that this be 0 mass %.

The master batch further comprises carbon black. For every 100 parts by mass of the rubber, it is preferred that the amount of carbon black be not less than 10 parts by mass, more preferred that this be not less than 20 parts by mass, and still more preferred that this be not less than 30 parts by mass. For every 100 parts by mass of the rubber, it is preferred that the amount of carbon black be not greater than 80 parts by mass, and more preferred that this be not greater than 60 parts by mass.

The master batch further comprises a compound according to Formula (I). For every 100 parts by mass of the rubber, it is preferred that the amount of the compound according to Formula (I) be not less than 0.1 part by mass, more preferred that this be not less than 0.5 part by mass, and still more preferred that this be not less than 1 part by mass. For every 100 parts by mass of the rubber, it is preferred that the amount of the compound according to Formula (I) be not greater than 10 parts by mass, and more preferred that this be not greater than 8 parts by mass.

The tire member manufacturing method in accordance with the first embodiment further comprises an operation in which master batch and high-cis polybutadiene rubber and compounding ingredient(s) are dry-blended in a mixer to obtain a mixture. It is preferred that cis-1,4 content of the high-cis polybutadiene rubber be not less than 90%, and more preferred that this be not less than 95%. Cis-1,4 content may be measured by infrared absorption spectroscopy. The compounding ingredient(s) might, for example, be stearic acid, zinc oxide, antioxidant, and/or the like. As examples of the antioxidant, aromatic-amine-type antioxidants, amine-ketone-type antioxidants, monophenol-type antioxidants, bisphenol-type antioxidants, polyphenol-type antioxidants, dithiocarbamate-type antioxidants, thiourea-type antioxidants, and the like may be cited. As the mixer, internal mixers, open roll mills, and the like may be cited as examples. As the internal mixer, Banbury mixers, kneaders, and the like may be cited as examples.

The tire member manufacturing method in accordance with the first embodiment further comprises an operation in which a vulcanizing-type compounding ingredient is added to the mixture, and in which the vulcanizing-type compounding ingredient is kneaded into the mixture to obtain a rubber composition. As examples of the vulcanizing-type compounding ingredient, sulfur, organic peroxides, and other such vulcanizing agents, vulcanization accelerators, vulcanization accelerator activators, vulcanization retarders, and so forth may be cited. As the sulfur, powdered sulfur, precipitated sulfur, insoluble sulfur, high dispersing sulfur, and the like may be cited as examples. As examples of the vulcanization accelerators, sulfenamide-type vulcanization accelerators, thiuram-type vulcanization accelerators, thiazole-type vulcanization accelerators, thiourea-type vulcanization accelerators, guanidine-type vulcanization accelerators, dithiocarbamate-type vulcanization accelerators, and so forth may be cited.

The rubber composition comprises a rubber component that comprises high-cis polybutadiene rubber. It is preferred that the amount of the high-cis polybutadiene rubber be 20 mass % to 60 mass % per 100 mass % of the rubber component. Causing this to be less than 20 mass % would be unlikely to produce much benefit in terms of improvement of fatigue resistance. Above 60 mass %, it is unlikely that there would be much benefit in terms of improvement of fatigue resistance following long-term storage.

The rubber composition further comprises natural rubber. It is preferred that the amount of the natural rubber be 40 mass % to 80 mass % per 100 mass % of the rubber component.

The rubber composition further comprises carbon black. For every 100 parts by mass of the rubber component, it is preferred that the amount of carbon black be not less than 10 parts by mass, more preferred that this be not less than 20 parts by mass, and still more preferred that this be not less than 30 parts by mass. For every 100 parts by mass of the rubber component, it is preferred that the amount of carbon black be not greater than 80 parts by mass, and more preferred that this be not greater than 60 parts by mass.

The rubber composition further comprises a compound according to Formula (I). For every 100 parts by mass of the rubber component, it is preferred that the amount of the compound according to Formula (I) be not less than 0.1 part by mass, and more preferred that this be not less than 0.5 part by mass. For every 100 parts by mass of the rubber component, it is preferred that the amount of the compound according to Formula (I) be not greater than 10 parts by mass, and more preferred that this be not greater than 8 parts by mass.

The rubber composition may further comprise stearic acid, zinc oxide, antioxidant, sulfur, vulcanization accelerator, and/or the like. It is preferred that the amount of the sulfur, expressed as equivalent sulfur content, be 0.5 part by mass to 5 parts by mass for every 100 parts by mass of the rubber component. It is preferred that the amount of the vulcanization accelerator be 0.1 part by mass to 5 parts by mass for every 100 parts by mass of the rubber component.

It is preferred that the rubber composition be employed in tire member(s), more preferred that it be employed in sidewall(s), and still more preferred that it be employed in sidewall(s) of tire(s) intended for heavy loads.

A tire manufacturing method in accordance with the first embodiment comprises an operation in which a green tire equipped with a tire member made up of the rubber composition is made. As the tire member, sidewall(s) may be cited as an example. The tire manufacturing method in accordance with the first embodiment further comprises an operation in which the green tire is heated. The tire obtained by the method of the first embodiment may be a tire intended for heavy loads.

Variations on the first embodiment will now be described. Whereas the tire member manufacturing method in accordance with the first embodiment comprised an operation in which carbon black and rubber latex were mixed to obtain a carbon black slurry, a variation on the first embodiment comprises, instead of that operation, an operation in which carbon black and water are mixed to obtain a carbon black slurry.

A tire member manufacturing method in accordance with a second embodiment comprises an operation in which a compound according to Formula (I) is added to a mixture comprising carbon black and rubber. For every 100 parts by mass of the rubber, it is preferred that the amount of carbon black in the mixture be not less than 10 parts by mass, more preferred that this be not less than 20 parts by mass, and still more preferred that this be not less than 30 parts by mass. For every 100 parts by mass of the rubber, it is preferred that the amount of carbon black be not greater than 80 parts by mass, and more preferred that this be not greater than 60 parts by mass. The rubber might, for example, be natural rubber, styrene-butadiene rubber, nitrile rubber, chloroprene rubber, and/or the like. For every 100 mass % of the rubber, it is preferred that the amount of natural rubber in the mixture be not less than 70 mass %, more preferred that this be not less than 80 mass %, still more preferred that this be not less than 90 mass %, and still more preferred that this be 100 mass %. For every 100 parts by mass of the rubber, it is preferred that the amount of high-cis polybutadiene rubber in the mixture be not greater than 10 parts by mass, more preferred that this be not greater than 5 parts by mass, still more preferred that this be not greater than 1 part by mass, and still more preferred that this be 0 part by mass. The amount of the compound according to Formula (I) that is added might, for example, be 0.1 part by mass to 10 parts by mass for every 100 parts by mass of rubber within the mixture.

The tire member manufacturing method in accordance with the second embodiment further comprises an operation in which the compound according to Formula (I) is dispersed within the mixture in the presence of water to obtain a master batch. The amount of water in the mixture might, for example, be not less than 1 part by mass, it being preferred that this be not less than 10 parts by mass, for every 100 parts by mass of rubber within the mixture. The upper limit of the range in values for the amount of water in the mixture might, for example, be 800 parts by mass, it being preferred that this be 600 parts by mass. Regarding the master batch, the description given at the first embodiment is incorporated here.

The tire member manufacturing method in accordance with the second embodiment further comprises an operation in which master batch and high-cis polybutadiene rubber and compounding ingredient(s) are dry-blended in a mixer to obtain a pre-addition-of-vulcanizing-type-compoundingingredient mixture. Regarding this, the description given at the first embodiment is incorporated here.

The tire member manufacturing method in accordance with the second embodiment further comprises an operation in which a vulcanizing-type compounding ingredient is added to the pre-addition-of-vulcanizing-type-compounding-ingredient mixture, and in which the vulcanizing-type compounding ingredient is kneaded into the pre-addition-of-vulcanizing-type-compounding-ingredient mixture to obtain a rubber composition. Regarding this, the description given at the first embodiment is incorporated here.

A tire manufacturing method in accordance with the second embodiment comprises an operation in which a green tire equipped with a tire member made up of the rubber composition is made. As the tire member, sidewall(s) may be cited as an example. The tire manufacturing method in accordance with the second embodiment further comprises an operation in which the green tire is heated. The tire obtained by the method of the second embodiment may be a tire intended for heavy loads.

WORKING EXAMPLES

Working examples in accordance with the present disclosure are described below.

Raw materials and reagents are indicated below.

| | |
|---|---|
| Concentrated natural rubber latex | "LA-NR (DRC = 60%)" manufactured by Regitex Co., Ltd. |
| Coagulant | Formic acid (reagent-grade 85%) manufactured by Nacalai Tesque, Inc. (diluted to obtain 10% solution and pH adjusted to 1.2 prior to use) |
| Natural rubber | RSS #3 |
| BR1 | "BR150B" manufactured by Ube Industries, Ltd. (polybutadiene rubber having 97% cis-1,4 content) |
| BR2 | "BUNA-CB22" manufactured by Lanxess AG (polybutadiene rubber having not less than 96% cis-1,4 content) |
| Carbon black | "SEAST 6 (N220)" manufactured by Tokai Carbon Co., Ltd. |
| Compound 1 | (2Z)-4-[(4-aminophenyl)amino]-4-oxo-2-butene acid sodium (compound according to Formula (I')) manufactured by Sumitomo Chemical Co., Ltd. |
| Stearic acid | "Stearic Acid Beads" manufactured by NOF Corporation |
| Zinc oxide | "Zinc Oxide Variety No. 2" manufactured by Mitsui Metal Mining Co., Ltd. |
| Antioxidant | "Antigen 6C" (N-phenyl-N'-(1,3-dimethylbutyl)-p-phenylenediamine) manufactured by Sumitomo Chemical Co., Ltd. |
| Sulfur | "Powdered Sulfur" manufactured by Tsurumi Chemical Industry Co., Ltd. |
| Vulcanization accelerator | "Sanceler CM-G" (N-cyclohexyl-2-benzothiazolylsulfenamide) manufactured by Sanshin Chemical Industry Co., Ltd. |

Preparation of Wet Master Batch at Working Examples 1 Through 3

Water was added at 25° C. to concentrated natural rubber latex to obtain a dilute natural rubber latex having a solids (rubber) concentration that was 0.52 mass %, and a natural rubber latex having a solids (rubber) concentration that was 28 mass %. 50 parts by mass of carbon black was added to 954.8 parts by mass of the dilute natural rubber latex, and a ROBO MIX manufactured by PRIMIX Corporation was used to agitate the post-addition-of-carbon-black dilute natural rubber latex to obtain a carbon black/natural rubber slurry. The carbon black/natural rubber shiny was added to the natural rubber latex having the solids (rubber) concentration that was 28 mass % in accordance with TABLE 1, and a mixer for household use manufactured by SANYO was used to agitate the post-addition-of-carbon-black/natural-rubber-slurry natural rubber latex at 11300 rpm for 30 min to obtain a pre-coagulation rubber latex. Formic acid serving as coagulant was added to the pre-coagulation rubber latex in an amount sufficient to achieve a pH of 4, and a filter was used to separate the coagulum from waste liquid. Compound 1 was added to the coagulum, and Compound 1 was dispersed within the coagulum as a Model V-02 screw press (squeezer-type single-screw dewatering extruder) manufactured by Suehiro EPM Corporation was used to dewater/plasticize at 180° C. the post-addition-of-Compound-1 coagulum. As a result of the foregoing procedure, a wet master batch was obtained.

Preparation of Dry Master Batch at Comparative Examples 2 Through 3

The compounding ingredient(s) were blended therewithin in accordance with TABLE 1 and were kneaded to obtain a dry master batch.

Preparation of Wet Master Batch at Comparative Example 4

Except for the fact that the coagulum was substantially completely dewatered prior to addition of the Compound 1 to the coagulum, a procedure identical to that of Working Example 1 was used to prepare the wet master batch of Comparative Example 4.

Preparation of Wet Master Batch at Comparative Example 5

Except for the fact that Compound 1 was not added to the coagulum, a procedure identical to that of Working Example 1 was used to obtain the wet master batch of Comparative Example 5.

Preparation of Unvulcanized Rubber at the Various Examples

The compounding ingredients except for sulfur and vulcanization accelerator were added in accordance with TABLE 1, a Model B Banbury mixer manufactured by Kobe Steel, Ltd., was used to carry out kneading, and the rubber mixture was discharged. The rubber mixture was then kneaded together with sulfur and vulcanization accelerator in a Model B Banbury mixer to obtain unvulcanized rubber.

Vulcanized Rubber Fatigue Resistance

The unvulcanized rubber was vulcanized at 150° C. for 30 min, and cracking tests were carried out in accordance with JIS K6260. Results are shown as indexed relative to a value of 100 for Comparative Example 1. The larger the value the better the fatigue resistance.

TABLE 1

|  |  |  | Comparative Example 1 | Comparative Example 2 | Comparative Example 3 | Comparative Example 4 | Comparative Example 5 | Working Example 1 | Working Example 2 | Working Example 3 |
|---|---|---|---|---|---|---|---|---|---|---|
| Manufacture dry master batch | Parts by mass | Natural rubber (RSS #3) | — | 70 | 70 | — | — | — | — | — |
|  |  | BR1 | — | 30 | — | — | — | — | — | — |
|  |  | Carbon black | — | 50 | 50 | — | — | — | — | — |
|  |  | Compound 1 | — | 1 | 1 | — | — | — | — | — |
| Manufacture wet master batch | Parts by mass | Natural rubber (solids content) | — | — | — | 70 | 70 | 70 | 70 | 70 |
|  |  | Carbon black | — | — | — | 50 | 50 | 50 | 50 | 50 |
|  |  | Compound 1 | — | — | — | 1 | — | 1 | 3 | 1 |
|  |  | Water content (parts by mass) of coagulum at time of addition of Compound 1 | — | — | — | — | 201 | 201 | 201 | 201 |
|  |  | Wa/Wb | — | — | — | — | — | 201 | 67 | 201 |
| Manufacture unvulcanized rubber | Parts by mass | Natural rubber (RSS #3) | 70 | — | — | — | — | — | — | — |
|  |  | Dry master batch | — | 151 | 121 | — | — | — | — | — |
|  |  | Wet master batch | — | — | — | 121 | 120 | 121 | 123 | 121 |
|  |  | BR1 | 30 | — | 30 | 30 | 30 | 30 | 30 | — |
|  |  | BR2 | — | — | — | — | — | — | — | 30 |
|  |  | Carbon black | 50 | — | — | — | — | — | — | — |
|  |  | Compound 1 | 1 | — | — | — | 1 | — | — | — |
|  |  | Stearic acid | 1 | 1 | 1 | 1 | 1 | 1 | 1 | 1 |
|  |  | Zinc oxide | 3 | 3 | 3 | 3 | 3 | 3 | 3 | 3 |
|  |  | Antioxidant | 1 | 1 | 1 | 1 | 1 | 1 | 1 | 1 |
|  |  | Sulfur | 2 | 2 | 2 | 2 | 2 | 2 | 2 | 2 |
|  |  | Vulcanization accelerator | 1 | 1 | 1 | 1 | 1 | 1 | 1 | 1 |
| Fatigue resistance |  |  | 100 | 75 | 105 | 111 | 109 | 121 | 125 | 124 |

At Working Examples 1 through 3, it is thought that Compound 1 dissolved in the water content of the coagulum, that Compound 1 was dispersed to a high degree therewithin, and that Compound 1 reacted satisfactorily with the natural rubber. Working Example 1 had better fatigue resistance than Comparative Example 4, Comparative Example 4 being an example in which the coagulant was completely dewatered prior to addition of Compound 1 thereto. Working Example 1 had better fatigue resistance than Comparative Example 5, Comparative Example 5 being an example in which Compound 1 was added during nonproduction kneading.

The invention claimed is:

1. A tire member manufacturing method comprising:
   an operation in which a master batch is made; and
   an operation in which the master batch and high-cis polybutadiene rubber are mixed,
   wherein cis-1,4 content of the high-cis polybutadiene rubber is not less than 90%;
   wherein the operation in which the master batch is made comprises
   an operation in which carbon-black-containing pre-coagulation rubber latex is coagulated to obtain a water-containing coagulum;
   an operation in which a compound according to Formula (I), below, is added to the water-containing coagulum; and
   an operation in which the compound is dispersed within the water-containing coagulum;

wherein Formula (I) is given by

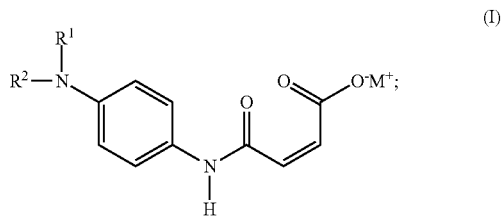

and
   wherein, at Formula (I), $R^1$ and $R^2$ each indicates a hydrogen atom, an alkyl group having 1 to 20 carbons, an alkenyl group having 1 to 20 carbons, or an alkynyl group having 1 to 20 carbons;
   $R^1$ and $R^2$ may be the same or different; and
   $M^+$ indicates sodium ion, potassium ion, or lithium ion.

2. The tire member manufacturing method according to claim 1 wherein
   the operation in which the compound is dispersed within the water-containing coagulum is an operation in which the compound is dispersed within the water-containing coagulum as the water-containing coagulum is being dewatered.

3. The tire member manufacturing method according to claim 1 wherein,
   at the operation in which the compound is added to the water-containing coagulum, taking the amount of water in the water-containing coagulum for every 100 parts by mass of rubber within the water-containing coagulum to be Wa, and taking the amount of the compound that is added for every 100 parts by mass of rubber within the water-containing coagulum to be Wb, Wa/Wb, being the ratio of Wa to Wb, is in a range that is 1 to 8100.

4. The tire member manufacturing method according to claim 1 wherein
the tire member is made up of a rubber composition that comprises a rubber component; and
the amount of the cis polybutadiene rubber in the rubber composition is in a range that is 20 mass % to 60 mass % per 100 mass % of the rubber component.

5. The tire member manufacturing method according to claim 4 wherein the rubber composition further comprises sulfur and vulcanization accelerator.

6. A tire manufacturing method comprising the tire member manufacturing method according to claim 1.

7. The tire member manufacturing method according to claim 1 further comprising an operation in which carbon black slurry and rubber latex are mixed to obtain the carbon-black-containing pre-coagulation rubber latex.

8. The tire member manufacturing method according to claim 7 wherein the rubber latex is natural rubber latex.

9. The tire member manufacturing method according to claim 1 wherein an extruder is used to disperse the compound at the operation in which the compound is dispersed within the water-containing coagulum.

10. The tire member manufacturing method according to claim 1 wherein the master batch comprises the carbon black and rubber; and
the carbon black is present in the master batch in an amount that is 10 parts by mass to 80 parts by mass for every 100 parts by mass of the rubber.

11. The tire member manufacturing method according to claim 1 wherein the master batch comprises the carbon black and rubber; and
the carbon black is present in the master batch in an amount that is 30 parts by mass to 60 parts by mass for every 100 parts by mass of the rubber.

12. The tire member manufacturing method according to claim 1 wherein the master batch comprises the compound and rubber; and
the compound is present in the master batch in an amount that is 0.1 part by mass to 10 parts by mass for every 100 parts by mass of the rubber.

13. The tire member manufacturing method according to claim 1 wherein the master batch comprises the compound and rubber; and
the compound is present in the master batch in an amount that is 0.5 part by mass to 8 parts by mass for every 100 parts by mass of the rubber.

14. A tire member manufacturing method comprising:
an operation in which a master batch is made; and
an operation in which the master batch and high-cis polybutadiene rubber are mixed, wherein cis-1,4 content of the high-cis polybutadiene rubber is not less than 90%;
wherein the operation in which the master batch is made comprises an operation in which a compound according to Formula (I), below, is added to a mixture comprising carbon black and rubber; and
an operation in which the compound is dispersed within the mixture in the presence of water;
wherein Formula (I) is given by

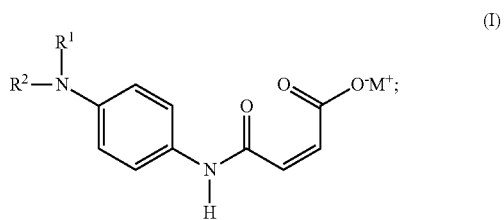

and
wherein, at Formula (I), $R^1$ and $R^2$ each indicates a hydrogen atom, an alkyl group having 1 to 20 carbons, an alkenyl group having 1 to 20 carbons, or an alkynyl group having 1 to 20 carbons;
$R^1$ and $R^2$ may be the same or different; and
$M^+$ indicates sodium ion, potassium ion, or lithium ion.

15. A tire manufacturing method comprising the tire member manufacturing method according to claim 14.

16. The tire member manufacturing method according to claim 14 wherein the carbon black is present in the mixture in an amount that is 10 parts by mass to 80 parts by mass for every 100 parts by mass of the rubber.

17. The tire member manufacturing method according to claim 14 wherein the carbon black is present in the mixture in an amount that is 30 parts by mass to 60 parts by mass for every 100 parts by mass of the rubber.

18. The tire member manufacturing method according to claim 14 wherein the compound is added to the mixture in an amount that is 0.1 part by mass to 10 parts by mass for every 100 parts by mass of the rubber within the mixture.

* * * * *